W. H. WALLACE & E. E. THOMPSON
ANIMAL POKE.
APPLICATION FILED JULY 22, 1912.
1,053,077.
Patented Feb. 11, 1913.
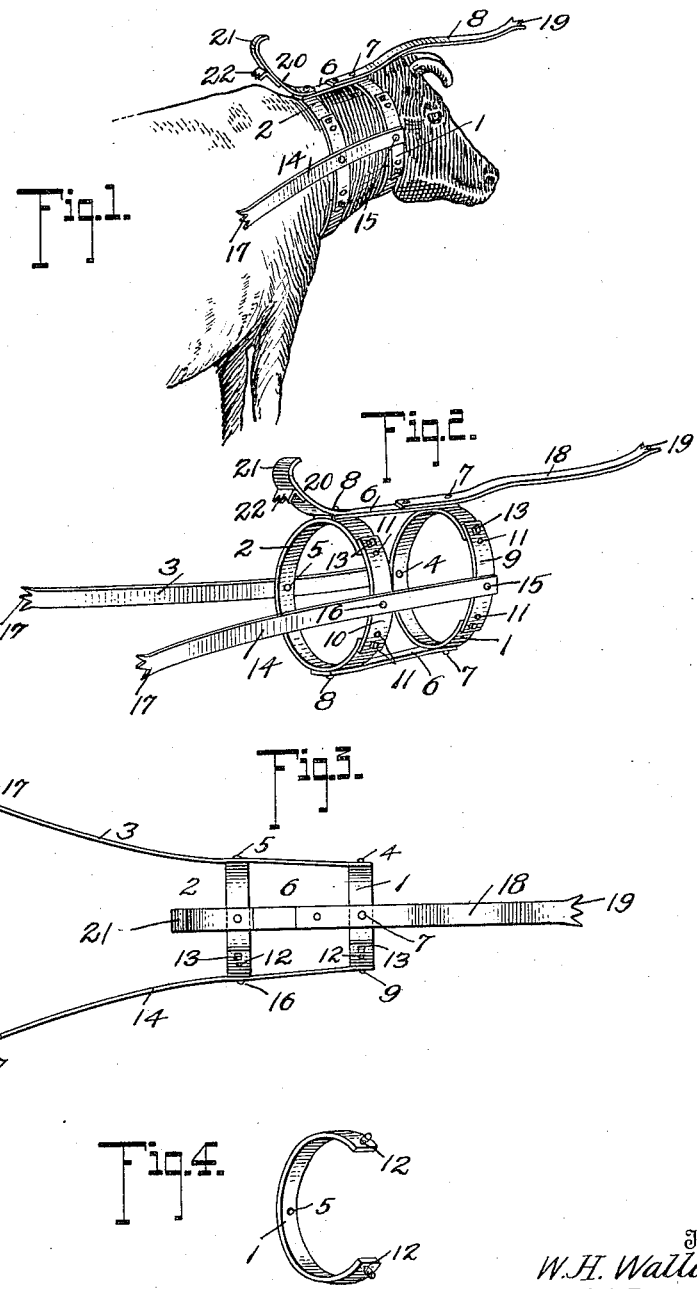
Witnesses
E. H. Wagner
D. E. Burdine
Inventors
W. H. Wallace
E. E. Thompson
By Robb & Robb
Attorneys

UNITED STATES PATENT OFFICE.

WILLIAM H. WALLACE, OF VICI, AND ELMER E. THOMPSON, OF CHESTER, OKLAHOMA.

ANIMAL-POKE.

1,053,077. Specification of Letters Patent. Patented Feb. 11, 1913.

Application filed July 22, 1912. Serial No. 710,957.

*To all whom it may concern:*

Be it known that we, WILLIAM H. WALLACE and ELMER E. THOMPSON, citizens of the United States, residing at Vici and Chester, respectively, in the counties of Woodward and Major, respectively, and State of Oklahoma, have invented certain new and useful Improvements in Animal-Pokes, of which the following is a specification.

This invention relates to animal pokes, and consists particularly of a device comprising a pair of yokes adapted to be attached to the neck of a cow or other domestic animal, said yokes being combined with members, suitably arranged thereon, adapted under certain conditions to prod or penetrate the flesh of the animal, and with a member which will prevent the intimate contact of the animal, to which the device has been applied, with another animal.

The primary object of the invention is to provide a device of the above character particularly adapted for application to a cow, which will not only prevent the latter from sucking her own udder, but will also prevent her from sucking the udders of other cows, and which will prevent the animal wearing the device from passing through or under a fence. For the latter two purposes, the device is obviously valuable for application to bulls as well as to cows.

A further object of the invention is to provide such a device which will possess extreme simplicity of construction, which will be adjustable so as to fit animals of different sizes, which may be readily applied to, and removed from, the animal, and which is so constructed as not to interfere with the grazing or feeding of the animal.

For a full understanding of the present invention, reference is to be had to the following description and to the accompanying drawings, in which—

Figure 1 is a perspective view showing the invention as applied to the neck of a cow; Fig. 2 is a perspective view showing the device detached; Fig. 3 is a top plan view of the device; and Fig. 4 is a detail view of one of the yokes hereafter referred to.

Throughout the following detail description and on the several figures of the drawings, similar parts are referred to by like reference characters.

Referring particularly to the drawings, the preferred embodiment of the invention consists of a front yoke or collar 1, and a rear yoke or collar 2, each being of a shape adapted to fit the neck of a cow, and adapted to engage the upper and lower sides of the neck. The yoke or collar 1 is made smaller than the yoke 2, as it engages the smaller part of the neck immediately back of the animal's head. Both of the yokes are formed open on one side, and the yokes 1 and 2 are connected longitudinally at their closed sides by the bar 3, which is pivotally connected to the yoke 1 by means of a bolt or rivet 4, and is pivotally connected to the yoke 2 by a bolt or rivet 5, the bar 3 extending rearwardly some distance beyond its connection with the yoke 2, as shown in Fig. 2, so as to normally lie in close contact with the side of the animal. For this purpose the bar 3 is inclined somewhat outwardly with respect to the yokes 1 and 2, as will be seen in Fig. 3.

The yokes 1 and 2 are further connected by means of the cross bars 6 which are pivotally connected to yoke 1 by means of the bolts or rivets 7 passing through apertures in the cross bars and yoke, and are pivotally connected to yoke 2 by means of the bolts or rivets 8 passing through apertures in the cross bars and the yoke 2, at the upper and lower ends of the yokes in each instance.

As before stated, the yokes 1 and 2 are open on one side thereof, and when applying the device, the yokes 1 and 2 will be placed on the animal so that the upper portions which are connected by the cross bar 6, will lie on and engage the upper side of the neck of the animal, the lower ends of the yokes passing around the lower side of the neck. In order to maintain the yokes in position, we provide the side bars 9 and 10, which connect the free ends of the yokes 1 and 2, respectively. For this purpose, and in order to render the yokes adjustable so as to fit the necks of animals of different sizes, each of the side bars 9 and 10 is provided adjacent its ends with a plurality of apertures 11, any one of which is adapted to register with an aperture 12, which is located adjacent each free end of each of the yokes 1 and 2, bolts 13 passing through the apertures 12 and a selected aperture 11.

Longitudinally connecting the side bars 9 and 10 at about central points thereof is a bar 14, similar in form to the bar 3 hereinbefore referred to, said bar 14 being pivotally connected to the side bar 9, by means of a bolt or rivet 15, which passes through apertures in the members 9 and 14, and is pivotally connected to the side bar 10 by means of a bolt or rivet 16, which passes through apertures in the members 14 and 10. When the device is in operative position, as seen in Fig. 2, it will be understood that the bar 14 is opposite the bar 3, so that the said bars will lie against opposite sides of the breast and ribs of the animal. Each of the bars 3 and 14 may be provided with the forks 17 at the rear terminal thereof, said forks being formed with more or less sharp points capable of pressing into the flesh of the animal.

From the foregoing description, it will be seen that by virtue of the pivotal connections 7, 8, 13, 15, 16, 4, and 5, we have provided a structure which when applied to the neck of the animal, will permit the latter a certain amount of play in its movements, since the forward yoke 1 with its connecting side bar 9, may be either raised or lowered with respect to the rear yoke 2, and yokes 1 and 2 may both move forwardly or rearwardly on the pivotal connections 4 and 15, on the one hand, and on the pivotal connections 5 and 16 on the other hand.

Connected to the forward end of the cross bar 6, and extending forwardly therefrom so that it will occupy a position between the horns of the cow, is a prodding member 18, the same being curved upwardly and then downwardly toward its forward terminal, as seen in Fig. 1, so as to be accommodated to the contour of the animal's head, so that it will project in a somewhat horizontal position a certain distance in front of the animal's head. The forward terminal of the prodding member 18 is provided with the forks 19, which may be made more or less sharp, the purpose of the attachment 18 not only preventing the contact of the animal wearing the device with another animal, but the forks 19, by their irritating effect on the animal approached, causing the latter to move out of the way of the animal wearing the device. The prodding member 18 is connected in any suitable manner to the forward portion of the neck engaging structure, but in the drawings we have shown the member 18 as connected to the cross bars 6 and yoke 1 by means of the bolt or rivet 7, already referred to.

Attached to the rear yoke 2 in any suitable manner, is an upwardly inclined hook member 20, bent at one end to form a hook 21, the lower side of the member 20 having attached thereto the fork member 22 having its depending ends formed more or less sharp said member 22 normally lying a short distance above the back of the animal. The member 20 is preferably formed of resilient metal, so that in practice, the same will occupy a position such as is shown in Fig. 1. When the animal attempts to pass through a wire fence or under a wooden fence, the wires or railings of the same will engage the hook 21, and during the struggles of the animal, the member 20 will be forced downwardly so that the sharp forks 22 will penetrate the animal's back, and thus cause the animal to retreat. When the animal has disengaged itself from contact with the fence, the resiliency of the metal member 20 will cause the same to assume its normal position, thus withdrawing the sharp forks 22 from the animal's flesh, but it is to be understood that in practice, these forks will be so formed as to cause little injury to the animal.

When the animal attempts to move its head in the direction of its udder, the lateral movement of the forward yoke 1 with respect to the rear yoke 2, will cause the sharp points 17 of either of the bars 3 and 14 to stick into the flesh of the animal adjacent the ribs, which in action will obviously serve to deter the animal from interfering with her udder.

Having described the invention, what is claimed as new is:

1. In an animal poke, a pair of yokes adapted to engage the neck of an animal, a pair of oppositely disposed bars longitudinally arranged with respect to said yokes, and pivotally connected thereto and extending rearwardly of the same, and a bar horizontally extending forwardly of and connected with the yokes and adapted to project in advance of the head of the animal.

2. In an animal poke, a pair of yokes adapted to engage the neck of an animal, a pair of oppositely disposed bars longitudinally arranged with respect to said yokes, and pivotally connected thereto and extending rearwardly of the same, a bar extending forwardly of the yokes and adapted to lie over the head of the animal, and a hook member connected with the yokes and extending rearwardly thereof adapted to engage the back of the animal, said member having a forked member connected to its under side.

3. In an animal poke, front and rear yokes adapted to engage the neck of an animal, a pair of oppositely disposed bars pivotally connected to said yokes, each of said yokes having portions detachable therefrom, means for adjustably connecting said detachable portions with said yokes, a bar pivotally connected to said detachable portions and extending rearwardly of said rear yoke, said bar when in operative position being arranged longitudinally with respect to said yokes, a second bar oppositely disposed to said last named bar pivotally connected to said yokes and also extending rearwardly of said rear yoke, each of said two last named bars having a rear forked terminal, a bar connected to the front yoke at the top portion thereof and extending forwardly of said yoke, said bar being adapted to engage the head of the animal and being provided with a front forked terminal, and a rearwardly extending member connected to the top part of the rear yoke, said member having a hooked end and having a forked member attached to its under surface.

In testimony whereof we affix our signatures in presence of two witnesses.

WILLIAM H. WALLACE.
ELMER E. THOMPSON.

Witnesses:
W. E. JAQUITH,
F. J. SEIDEL.

Copies of this patent may be obtained for five cents each, by addressing the "Commissioner of Patents, Washington, D. C."